No. 623,643. Patented Apr. 25, 1899.
F. WEBER.
CART.
(Application filed Oct. 12, 1898.)
(No Model.) 2 Sheets—Sheet 1.
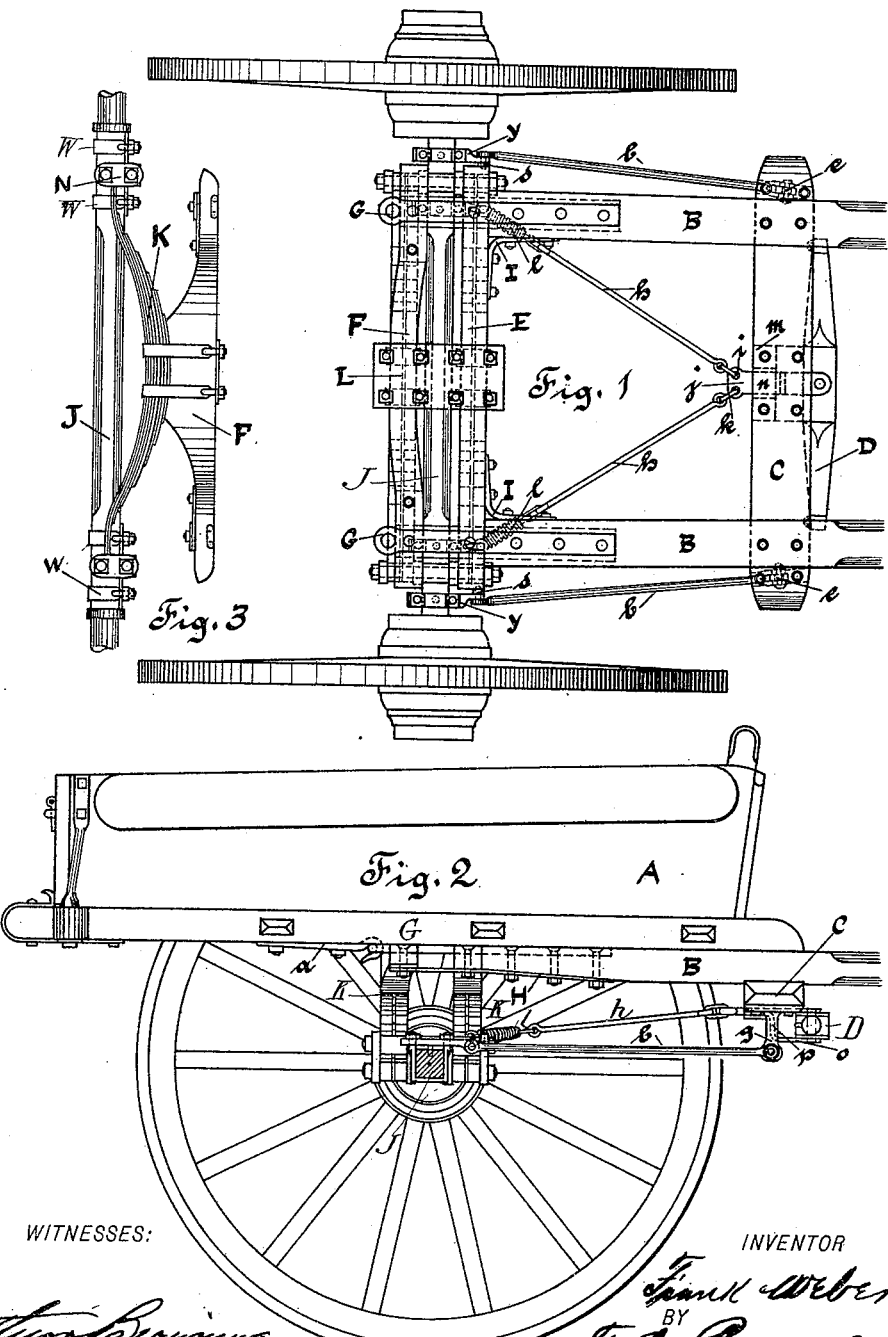
WITNESSES: INVENTOR
Frank Weber
BY
Brown
Asso, ATTORNEY.

No. 623,643. Patented Apr. 25, 1899.
F. WEBER.
CART.
(Application filed Oct. 12, 1898.)
(No Model.) 2 Sheets—Sheet 2.
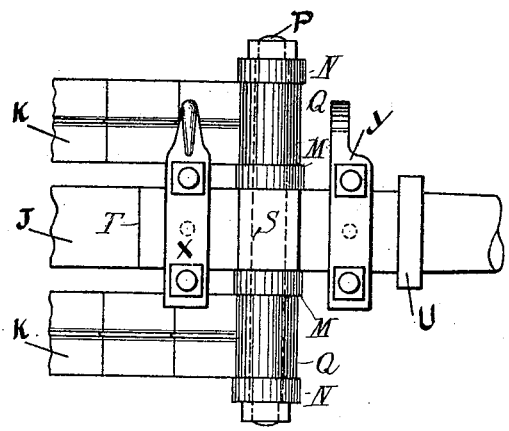
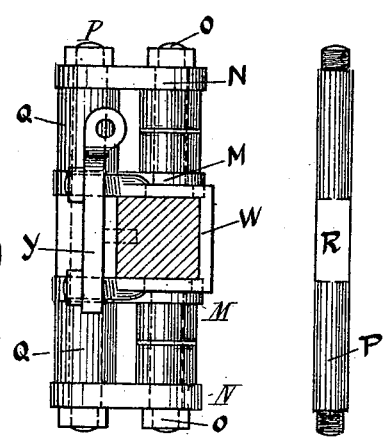
Fig. 4. Fig. 5. Fig. 6.
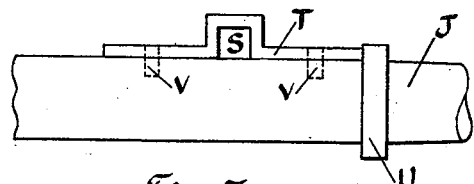
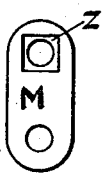
Fig. 7. Fig. 8. Fig. 9.
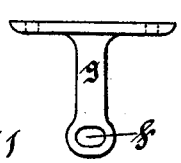
Fig. 10. Fig. 11.
Fig. 12.
Fig. 13.
WITNESSES:
Arthur Bruning.
S. E. Zimmerman.
INVENTOR
Frank Weber
BY F. L. Brown
Ass. ATTORNEY.

UNITED STATES PATENT OFFICE.

FRANK WEBER, OF LOUISVILLE, KENTUCKY.

CART.

SPECIFICATION forming part of Letters Patent No. 623,643, dated April 25, 1899.

Application filed October 12, 1898. Serial No. 693,352. (No model.)

*To all whom it may concern:*

Be it known that I, FRANK WEBER, a citizen of the United States, residing at Louisville, in the county of Jefferson and State of Kentucky, have invented certain new and useful Improvements in Carts; and I do hereby declare the following to be a full, clear, and exact description of the invention, such as will enable others skilled in the art to which it appertains to make and use the same.

This invention has relation to improvements in dumping-carts; and it consists in the novel construction and arrangement of parts of which it is composed, as will be hereinafter fully described.

The annexed drawings, to which reference is made, fully illustrate my invention, in which—

Figure 1 is a plan view of my cart from above with the bed removed. Fig. 2 is a side elevation of the same with the nearest wheel removed. Fig. 3 is a view showing part of the axle with the rear spring and bar. Fig. 4 is a detail plan of the connections at the ends of the springs from the top. Fig. 5 is a like view of the same from the end. Fig. 6 is a view of a bolt P, having the squared part R, which rests against the axle of the cart. Fig. 7 is a vertical view of a part of the axle of the cart and of a strap T, the loop S of which secures the squared portion R of the bolt P to the axle. Fig. 8 is a view of one of the inner shackles M of the springs and which is placed nearest the axle of the cart. Fig. 9 is a view of one of the outer shackles of the springs. Fig. 10 is a tension-rod, and Fig. 11 is a stay to which the forked end of the tension-rod is bolted. Fig. 12 is a top view of the dumping hook and eye, and Fig. 13 is a side view of the same.

Similar letters refer to similar parts throughout the several figures.

A is the body of the cart, and B B are its shafts.

C is the cross-bar of the shafts, and D the singletree. The shafts are connected to the forward and rear spring-bars E and F by bolts passing through the dumping-eye G above and the plate H below. The corner-braces I I are bolted to the shafts and the forward spring-bar E. The ends of the rear spring-bar F are curved forward, so as to allow the rear end of the dumping-eye G to be placed as nearly as possible above the axle J of the cart in order to balance and facilitate the dumping and raising of the bed of the cart. The springs K K stand just before and behind the axle J. They are clipped and bolted to the cross-bars E and F through the top plate L, which connects the cross-bars together. The extremities of the springs are secured to the lower ends of the inner and outer shackles M and N by the bolts O, which pass through the cylinders formed by the ends of the springs. The bolts P P pass through the upper ends of the shackles and drums Q. Each of the bolts P has a part R of its middle squared, which is secured to the axle J by the loop S of the strap T. The strap T, the outer end of which rests against the collar U of the axle J, is secured in position by the stay-pins V, the straps W, and the plates X and Y. The straps T may be placed below the axle J, if desired, instead of above. A hook is formed at the top of the forward end of the plate X and an eye at the side of the forward end of the plate Y. The inner shackles M have the countersinks Z for the heads of the bolts O, which prevent the interference of the axle J with the heads of these bolts when the springs vibrate. $a$ are the dump-hooks, which are secured to the sills of the cart-body by bolts.

To the rear end of the tension-rod $b$ is secured the threaded pin C, which passes through the eye of the plate X and is held in place by a nut $d$. A bolt $e$ passes through the forked end of the tension-rod $b$ and through the slotted eye $f$ of the stay $g$. The stays $g$ are bolted to the cross-bar C of the shafts near its ends. The use of the tension-rods $b$ is to stiffen and brace the frame of the running-gear of the cart. The slotted eye $f$ allows a slight play of the tension-rod $b$ when the cart-wheels strike an obstacle and tends to break the force of the blow.

$h$ are two rods, the forward ends of which are connected to the eyes $i$ in the sliding plate $j$ by the links $k$, and the rear ends thereof are attached to one end of the spring-links $l$, while said spring-links are in turn connected with the plate X by the hook formed upon it. Secured to the cross-bar C of the shafts and on the under side thereof is a plate *m*, which is provided with a loop *n*, in which the plate *j* has a longitudinal play. This slide-plate *j* is provided at its rear ends with eyes *i* and with an angular plate *o*, provided with a shoulder *p*. The singletree D is bolted between the forward ends of the plates *j* and *o*. Thus it will be seen that the direct draft is from the singletree to the axle through the medium of the rods *h*. This arrangement is practically the same as that described in Letters Patent No. 449,720 and issued to me on April 7, 1891.

The body of the cart when in its raised position is secured in place by any suitable contrivance, which is usually placed at the forward ends of the sills of the body of the cart.

Among the advantages of my invention are the compactness of the springs, allowing the dump eye and hook to be placed nearly above the axle, which facilitates the dumping and raising the bed of the cart; the manner of securing the shafts to the spring-bars by the plates H, and the dump-eyes G and the corner-braces I, which, in connection with the tension-rods *h*, make an exceedingly-rigid frame for the running-gear. The top plate L of the cross-bars makes the springs move exactly together. The springs do not interfere with the width of the body of the cart, as is the case with most side-spring carts. The wheels may be separated to correspond with the "track" of ordinary carts, and the body of the cart may be made as wide as the distance between the wheels will allow without any reference to the springs. Another advantage is that an ordinary cart may be readily supplied with my improvements.

Having thus described my invention, what I claim, and desire to secure by Letters Patent, is—

1. In a cart, the combination with the axle provided toward its ends with squared loops, of springs arranged at the front and rear of the axle in parallelism therewith, bars secured to the springs and connected to each other centrally, shackles at the outer ends of the springs, and bolts passed through the shackles and the loops on the axle the bolts being squared at their center, substantially as described.

2. In a cart, the combination with the axle, of springs arranged at the front and rear of the axle in parallelism therewith, bars secured to the springs and connected to each other centrally, and straps connecting the bars at their ends and carrying dump-eyes, the rear bar being offset at its ends to bring the dump-eyes close to the axle.

3. In a cart, the combination with the axle, of springs at the front and rear thereof, bars secured to the springs, the shafts, straps connecting the upper side of the shafts and bars and carrying dump-eyes, and plates connecting the under side of the shafts and bars.

4. In a cart, the combination with the axle and shaft cross-bar, of a singletree slidably mounted on the cross-bar, rods connected at one end to the singletree and having spring connection at their other end to the axle, and rods connecting the axle and cross-bar.

In testimony whereof I affix my signature in presence of two witnesses.

FRANK WEBER.

Witnesses:
 JAMES W. BEATTIE,
 SAML. J. DOHRMANN.